Figure 1:
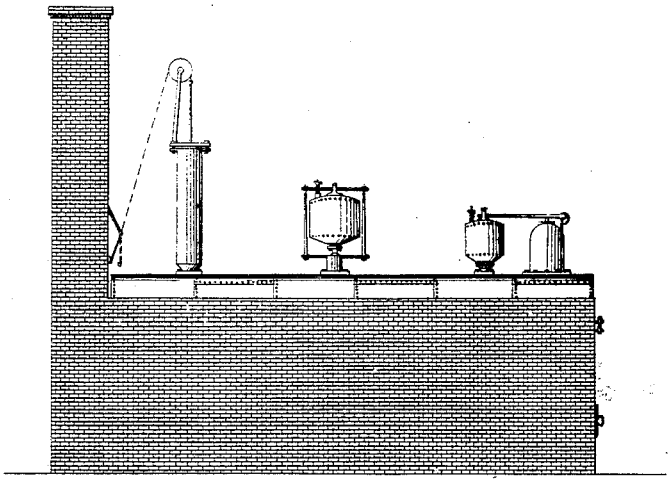
Figure 2:
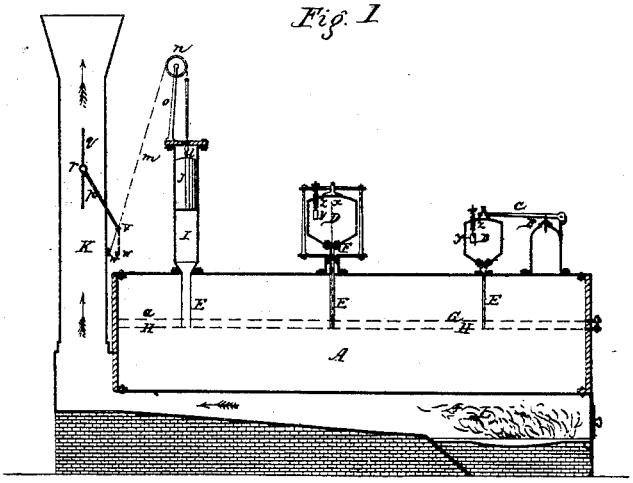

NO PAGE DESCRIPTION AVAILABLE

EXAMINER

W. Duff,

Steam Safety Valve.

No. 71. A.I. Patented Nov. 26, 1844.

AM. PHOTO-LITHO. CO. N.Y. (OSBORNE'S PROCESS)